United States Patent
Lee et al.

(10) Patent No.: US 9,152,181 B2
(45) Date of Patent: Oct. 6, 2015

(54) APPARATUS FOR MOUNTING STYLUS PEN IN AN INFORMATION DEVICE

(75) Inventors: Sung-Young Lee, Gyeongsangbuk-do (KR); Ki-Deuk Kim, Gyeongsangbuk-do (KR); Jung-Woong Hyun, Gyeongsangbuk-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 156 days.

(21) Appl. No.: 13/561,166

(22) Filed: Jul. 30, 2012

(65) Prior Publication Data

US 2013/0050922 A1    Feb. 28, 2013

(30) Foreign Application Priority Data

Aug. 22, 2011    (KR) .................. 10-2011-0083332

(51) Int. Cl.
*G06F 1/16* (2006.01)
*H04M 1/02* (2006.01)

(52) U.S. Cl.
CPC ...... *G06F 1/1656* (2013.01); *G06F 2200/1632* (2013.01); *H04M 1/026* (2013.01)

(58) Field of Classification Search
CPC ............................................. G06F 2200/1632
USPC ................... 361/679.01, 679.4, 679.55, 730; 345/179, 180, 184; 178/19.01
See application file for complete search history.

(56) References Cited

U.S. PATENT DOCUMENTS

| 5,633,471 A | 5/1997 | Fukushima | |
|---|---|---|---|
| 2009/0184884 A1* | 7/2009 | Kyou et al. | 343/901 |
| 2009/0231306 A1* | 9/2009 | Tseng | 345/179 |

FOREIGN PATENT DOCUMENTS

| JP | 11-028891 A | 2/1999 |
|---|---|---|
| KR | 20-0148909 Y1 | 6/1999 |
| KR | 10-2004-0013642 A | 2/2004 |
| KR | 10-2010-0088487 A | 8/2010 |

* cited by examiner

*Primary Examiner* — Hung S Bui
*Assistant Examiner* — James Wu
(74) *Attorney, Agent, or Firm* — Cha & Reiter, LLC.

(57) ABSTRACT

An apparatus for mounting in a secure manner a stylus pen in an information device, in which there are a casing and the stylus pen. A guide unit having an inlet and an outlet is configured to have an opened top at the inlet and a closed bottom at the outlet, extended along a length direction of the casing, for accommodating the stylus pen.

8 Claims, 7 Drawing Sheets

APPARATUS FOR MOUNTING STYLUS PEN IN AN INFORMATION DEVICE

CLAIM OF PRIORITY

This application claims priority under 35 U.S.C. §119(a) to the earlier filing date of a Korean Patent Application filed in the Korean Intellectual Property Office on Aug. 22, 2011 and assigned Serial No. 10-2011-0083332, the entire contents of which are incorporated herein by reference.

BACKGROUND OF THE INVENTION

1. Field of the Invention

The present invention relates to an information device, and more particularly, to an apparatus for mounting a stylus pen used to input data to an information device.

2. Description of the Related Art

An information device according to the present invention is typically a portable device such as a cellular phone, a laptop computer, a notebook computer, a smart phone, a smart pad, a Personal Digital Assistant PDA, etc.). Such a portable device is provided with an information input/output unit like a touch screen. A user inputs information by touching the touch screen with his or her fingers or a stylus pen. The widely used stylus pen is carried with the portable device, strapped to the portable device or detachably mounted to the portable device.

Prior art stylus mounting devices are disclosed in Japanese Patent Laid-Open No. 1999-28891, Korea Registered Utility Model No. 0148909, Korea Patent Publication No. 2010-88487, and U.S. Pat. No. 5,633,471.

A prior art stylus pen mounting apparatus in a prior art information device is shown with reference to FIGS. 1 to 4.

Referring to FIGS. 1 to 4, a battery pack (in the interest of clarity, not shown) is detachably mounted to a casing 50 of a portable information device. A stylus pen 51 is inserted into or removed from the casing 50. A guide unit 52 is formed to allow insertion or removal of the stylus pen 51 into or from the casing 50. The guide unit 52 includes a plurality of guide holders, specifically an upper-end guide holder 524, an upper guide holder 525, and a lower-end guide holder 526 and a plurality of guide openings, specifically an upper-end guide opening 521, an upper guide opening 522, and a lower-end guide opening 523. The guide unit 52 is linearly extended along a length direction of a side surface of the casing 50, with the upper-end guide opening 521, the upper guide opening 522, and the lower-end guide opening 523 exposed to the outside. That is, the inside and outside of the casing 50 spatially communicates with each other by means of the three guide openings 521, 522 and 523. In addition, the upper-end guide holder 524, the upper guide holder 525, and the lower-end guide holder 526 are provided respectively beside the upper-end guide opening 521, the upper guide opening 522, and the lower-end guide opening 523, for keep the inserted stylus pen 51 secured in the guide unit 52. FIGS. 3 and 4 illustrate the stylus pen 51 inserted into the casing 50.

Due to the nature of mold fabrication for forming the casing, the guide unit for allowing the stylus pen to be inserted into or removed from the information device is configured to have a plurality of guide openings and a plurality of guide holders.

If the guide unit has a configuration with upper-end, upper, and lower-end guide openings and upper-end, upper, and lower-end guide holders formed in the casing, the gaps between the openings and the holders are exposed to the outside and thus introduce foreign material into the casing.

Especially, water may be introduced into the casing. If an additional attachment is used to close the gaps, product cost increases and an assembly process is degraded.

In the case where a spring (not shown) is installed in the guide unit to keep the stylus pen secured stably and enable smooth insertion and removal of the stylus pen, the use of the spring also increases the product cost and degrades the assembly process.

SUMMARY OF THE INVENTION

An aspect of the present invention is to address at least the problems and/or disadvantages and to provide at least the advantages described below. Accordingly, an aspect of the present invention is to provide a stylus pen mounting apparatus for enabling stable insertion and removal of a stylus pen in an information device.

Another aspect of the present invention is to provide a stylus pen mounting apparatus for preventing introduction of foreign materials into a casing through a guide unit in an information device.

Another aspect of the present invention is to provide a stylus pen mounting apparatus for, keeping the stylus pen secured stably when a stylus pen is completely inserted in the mounting apparatus, using elastic force of an elastic member in an information device.

A further aspect of the present invention is to provide a stylus pen mounting apparatus with a guide unit having simplified outward appearance in an information device.

In accordance with an embodiment of the present invention, there is provided an apparatus for mounting a stylus pen in an information device, in which there are a casing and the stylus pen, a guide unit having an inlet and an outlet, configured to have an opened top at said inlet and a closed bottom at said outlet, extended along a length direction of the casing, which accommodates the stylus pen.

In accordance with another embodiment of the present invention, there is provided an apparatus for mounting a stylus pen in an information device, in which there are a casing and the stylus pen, a guide unit has an inlet and an outlet, is configured to have an opened top at said inlet and a closed bottom at said outlet, extended along a length direction of the casing, which accommodates the stylus pen, and an elastic member mounted to the outlet of the guide unit, for forming the closed bottom of the outlet, for separating the guide unit from the interior of the casing and for keeping the stylus pen secured.

BRIEF DESCRIPTION OF THE DRAWINGS

The above features and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION

Figure 1:
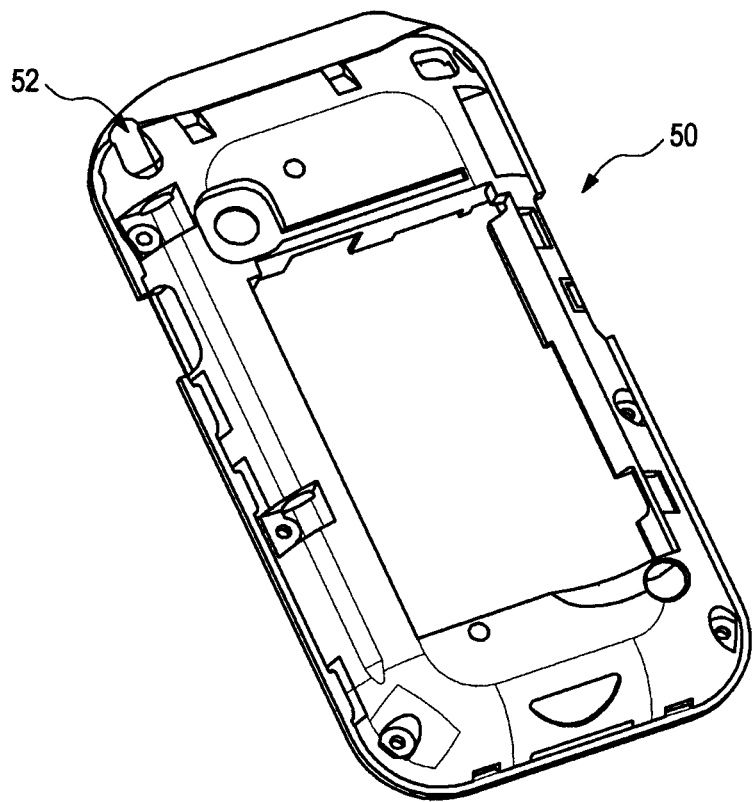
FIG. 1 is a perspective view illustrating a guide unit in a casing of a prior art information device.
Figure 2:
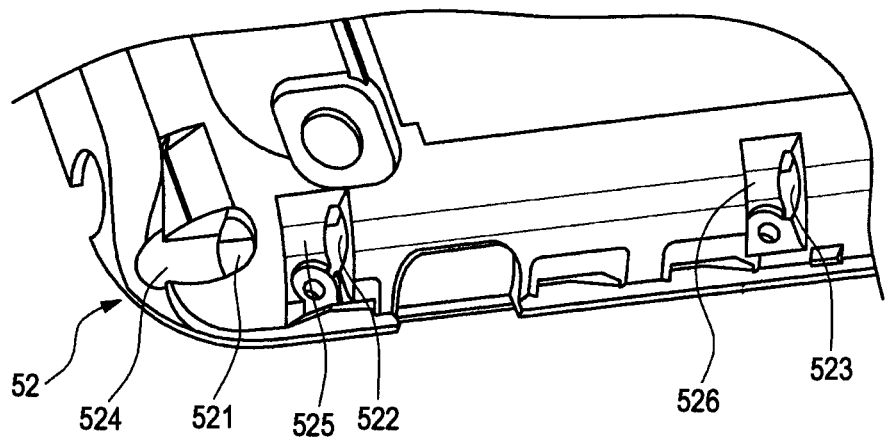
FIG. 2 is a perspective view illustrating an enlarged important part of the guide unit in the casing of the prior art information device.
Figure 3:
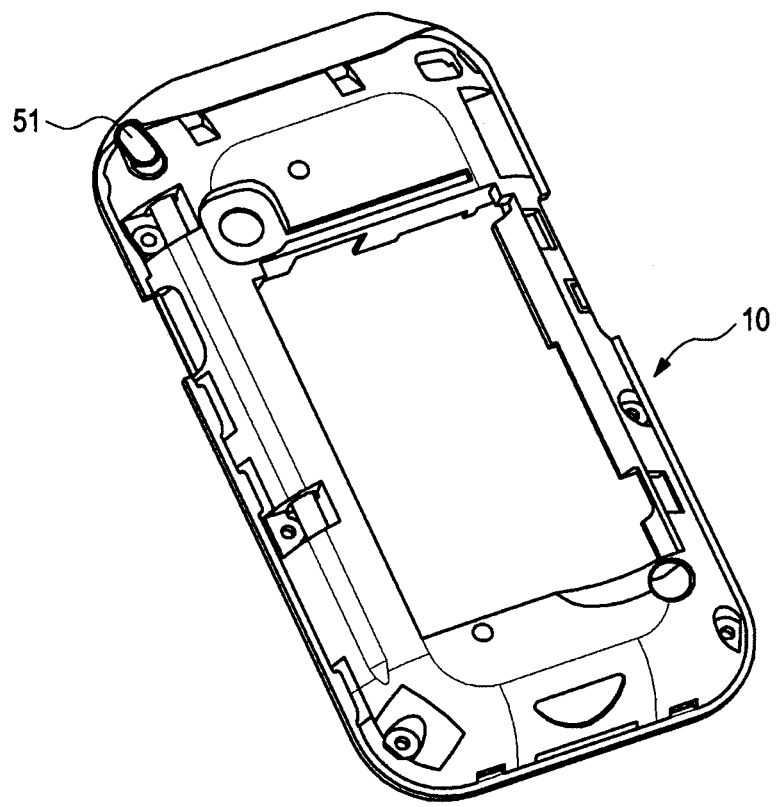
FIGS. 3 and 4 are perspective views of a stylus pen mounted to the casing of the prior art information device, illustrating the outside and inside of the casing, respectively.
Figure 4:
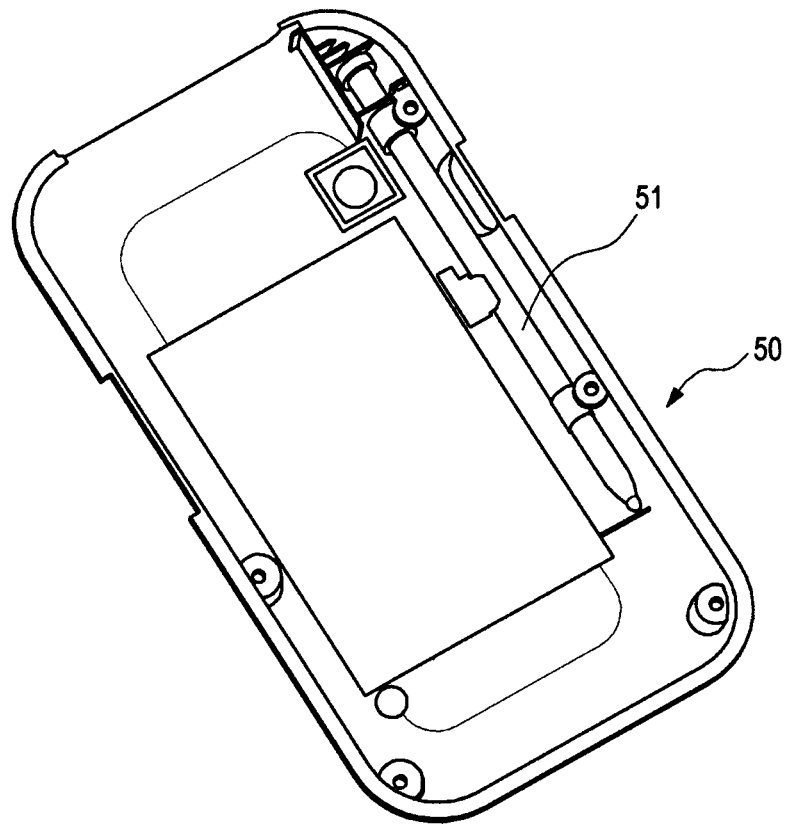

Reference will now be made in detail to the preferred embodiments of the present invention with reference to the accompanying drawings. For the purposes of clarity and simplicity, a detailed description of a generally known function and structure of the present invention will be avoided lest it should obscure the subject matter of the present invention.

The configuration of a stylus pen mounting apparatus according to the present invention will be described with reference to the attached drawings. In these drawings, like reference numerals denote the same components.

Figure 5:
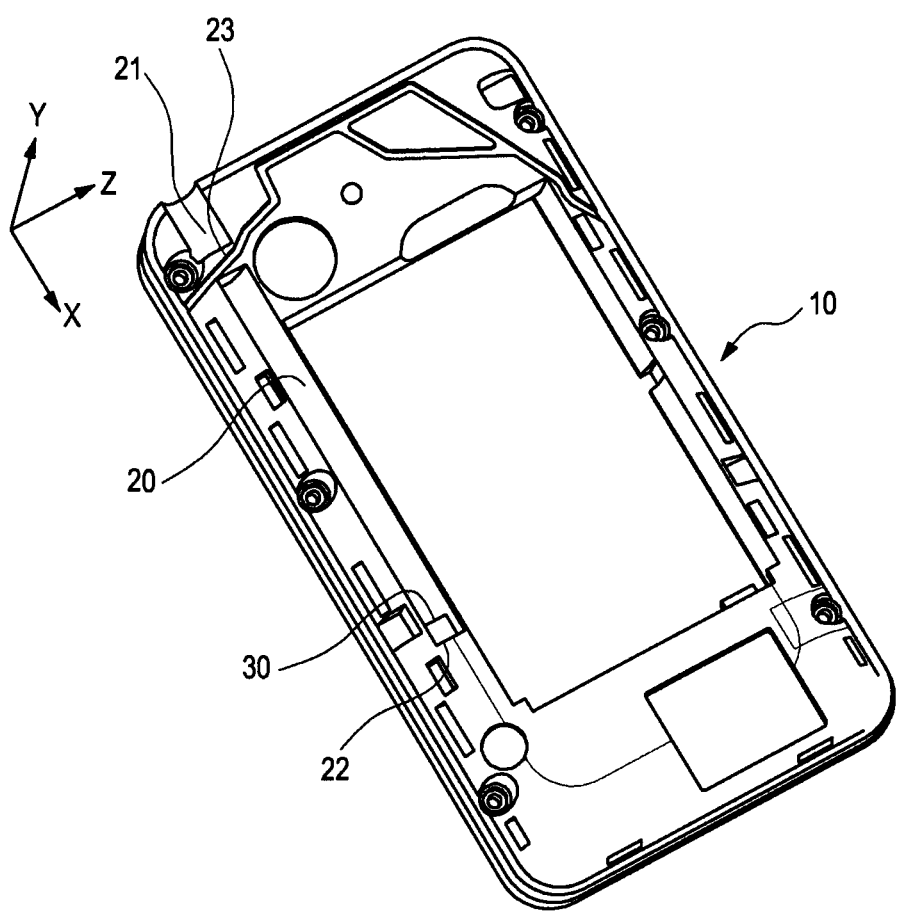
FIG. 5 is a perspective view illustrating a guide unit in a casing of an information device according to one embodiment of the present invention.
Figure 6:
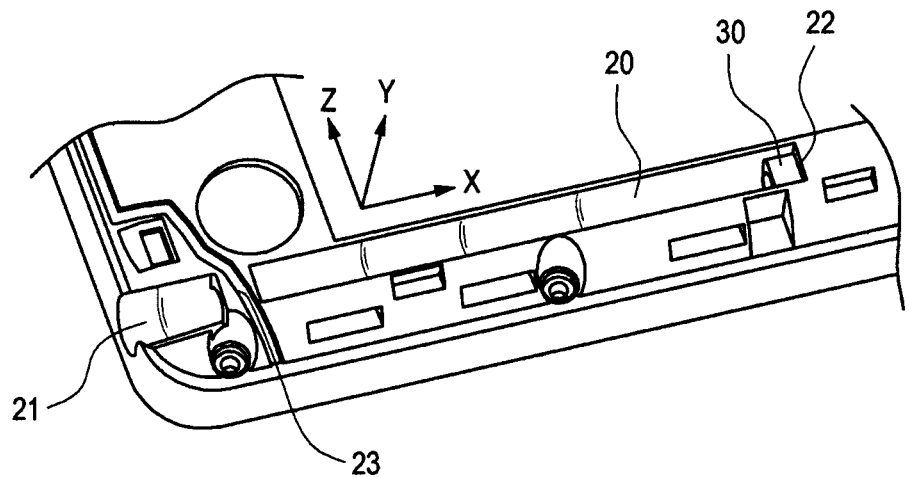
FIG. 6 is a perspective view illustrating an enlarged part of a portion of the guide unit in the casing of the information device according to the embodiment of present invention shown in FIG. 5.
Figure 7:
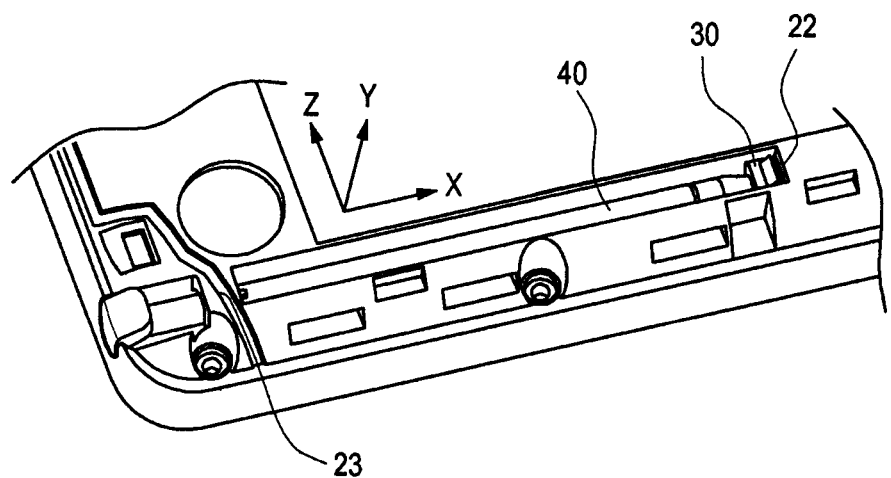
FIG. 7 is a perspective view illustrating a stylus pen inserted into the guide unit in the casing of the information device according to the present invention.

With reference to FIGS. 5, 6 and 7, the configuration of the stylus pen mounting apparatus according to the present invention will be described below. FIGS. 5, 6 and 7 illustrate the stylus pen mounting apparatus used in an information device. The information device may be, for example, a smart phone which has recently become very popular, a tablet PC, or a laptop computer. In FIGS. 5 and 6, the X axis represents a length direction (latitudinal direction) of a casing 10. Specifically, +X axis represents a direction in which a stylus pen 40 is inserted and −X axis represents a direction in which the stylus pen 40 is removed. Y axis represents a thickness direction of the casing 10. Specifically, +Y axis represents an upward direction of a guide unit 20 provided in the casing 10 and −Y axis represents a downward direction of the guide unit 20. The +Z axis represents a longitudinal direction of the casing 10.

The stylus pen mounting apparatus is mounted in the casing 10, particularly a lower casing of the information device in view of the external design of the information device. The stylus pen mounting apparatus is disposed at a predetermined position of the casing 10, spatially fully isolated from the interior of the casing 10 to prevent introduction of external foreign materials into the casing 10 and keep the stylus pen 40 secured stably. The stylus pen mounting apparatus includes the casing 10, the stylus pen 40, the guide unit 20, and an elastic member 30.

The guide unit 20 provides a path in which the stylus pen 40 is inserted or removed and stably accommodates the stylus pen 40. The guide unit 20 includes an inlet 21 corresponding to an upper end area and an outlet 22 corresponding to a lower end area. The top of the guide unit 20 is opened (in the +Y axis direction) and its bottom is closed (in the −Y axis direction), extended along the length (X) direction of the casing 10. Since the bottom of the guide unit 20 is closed, the guide unit 20 is completely spatially isolated from the interior of the casing 10. Therefore, it is impossible for external foreign materials to be introduced into the casing 10 through the guide unit 20. Considering the lower casing 10 of the information device is vulnerable to introduction of foreign materials while the information device is held in a user's hand or pouch, carried in a bag, or placed on a table, the stylus pen mounting apparatus of the present invention is preferably mounted in the lower casing 10.

The inlet 21 and the outlet 22 keep the stylus pen 40 secured by locking an upper portion and a lower end portion of the stylus pen 40 inserted into the guide unit 20. The inlet 21 is provided with a guide 23 surrounding the outer circumferential surface of a predetermined upper area of the inserted stylus pen 40. The guide 23 is extended perpendicularly to the length direction of the guide unit 20 (i.e. in the Z axis direction), for securing the upper portion of the inserted stylus pen 40. The outlet 22 is engaged with the later-described elastic member 30, for securing the lower end portion of the stylus pen 40.

Figure 8:
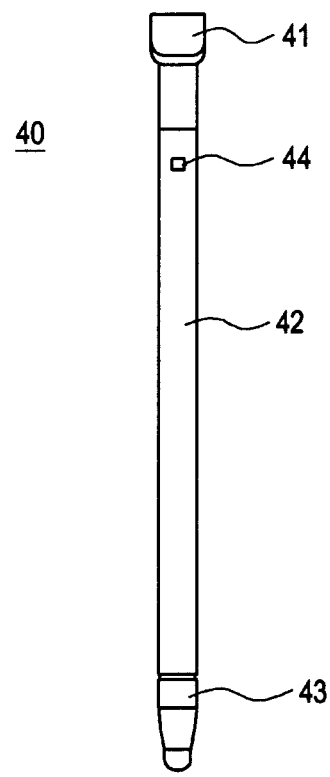
FIG. 8 is a frontal view illustrating the stylus pen to be inserted into or removed from the guide unit according to the present invention.

FIG. 8 is a plan view of the stylus pen 40 according to the present invention. Referring to FIG. 8, the stylus pen 40 includes a head 41, a body 42, and a lower end portion 43. The head 41 is non-cylindrical, the body 42 is cylindrical, and the lower end portion 43 is substantially conical. When the stylus pen 40 is completely inserted into the guide unit 20, the non-cylindrical head 41 is positioned at the inlet 21 of the guide unit 20, non-rotatably. That is, the head 41 is shaped roughly into a hexahedron and a second catching protrusion 44 interworks with a first catching protrusion during insertion of removal of the stylus pen 40. When the stylus pen 40 is completely inserted, the lower end portion 43 is inserted into the later-described elastic member 30 and kept secured. The second catching protrusion 44 is formed on an upper outer circumferential surface of the stylus pen 40, protruding in an outer circumferential direction.

Figure 9:
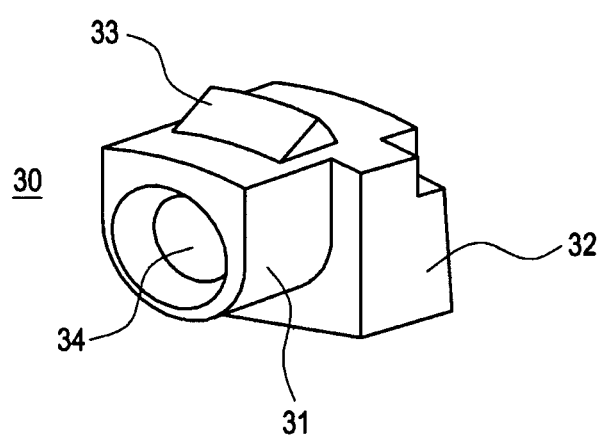
FIG. 9 is a perspective view illustrating an elastic member provided in an outlet of the guide unit according to the present invention.
Figure 10:
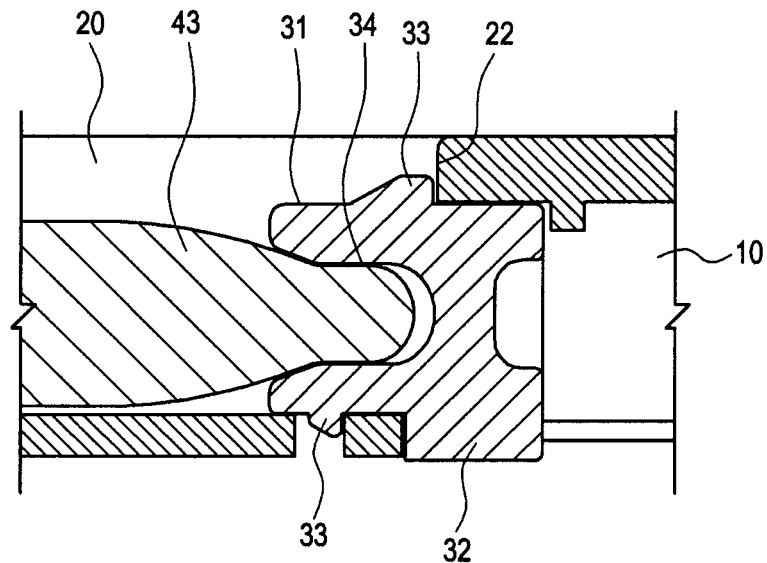
FIG. 10 is a sectional view illustrating a lower end portion of the stylus pen inserted into the elastic member according to the present invention.

Referring to FIGS. 9 and 10, the elastic member 30 is engaged with the outlet 22, thus closing the guide unit 20 from the interior of the casing 10. This elastic member 30 functions to keep the inserted stylus pen 40 secured stably without movement. The elastic member 30 is formed of highly elastic rubber, including an elastic body 31, an engagement portion 32, a catching portion 33, and a holder 34. The engagement portion 32 is extended from one end portion of the elastic body 31 and inserted into the outlet 22. The inserted engagement portion 32 is positioned inside the casing 10. At least one catching portion 33 is provided in the elastic body 31, for securing the elastic body 30 in the outlet 22. The engagement portion 32 and the catching portion 33 fix the elastic member 30 firmly in the outlet 22. The holder 34 is recessed into a surface of the elastic body 31 opposite to the engagement portion 32, for allowing the lower end portion 43 of the stylus pen 40 to be elastically inserted thereinto and keeping the lower end portion 43 fixed.

In addition, when the stylus pen 40 is fully inserted, the elastic member 30 absorbs an insertion impact so that the user may stably insert or remove the stylus pen 40.

Figure 11:
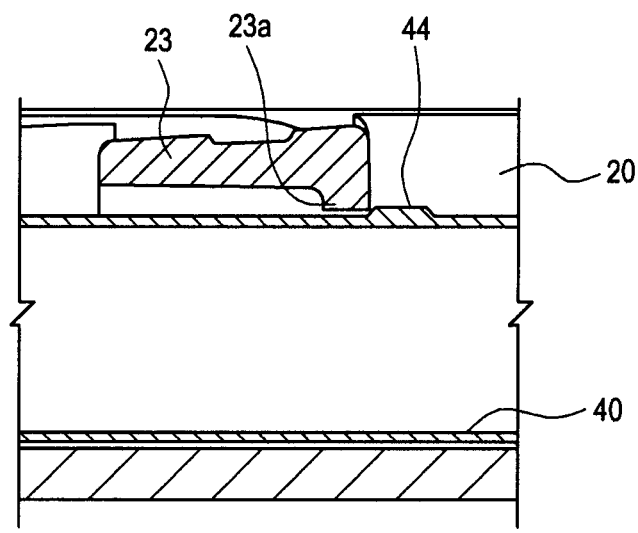
FIG. 11 is a sectional view illustrating interaction between a guide in the guide unit and the stylus pen according to the present invention.

Referring to FIG. 11, a device is further provided between the guide 23 and the stylus pen 40 to prevent the stylus pen 40 from getting out of place. The device includes the first and second catching protrusions 23*a* and 44. The first catching protrusion 23*a* protrudes downward from an inner surface of the guide 23 provided in a predetermined area of the guide unit 20. As described before, the second catching protrusion 44 protrudes in the outer circumferential direction from the upper outer circumferential surface of the stylus pen 40. As the stylus pen 40 is inserted or removed, the stylus pen 40 moves back and forth along the guide unit 20, not getting out of place due to interworking between the first and second catching protrusions 23a and 44. Obviously, the afore-described elastic member 30 also keeps the inserted stylus pen 40 secured at the position where it is inserted.

As is apparent from the above description, since the guide unit of the present invention is adopted in an information device, it prevents introduction of foreign materials into the casing. Especially, the guide unit is simplified in structure and thus also simplified in outward design. Furthermore, the present invention provides a stable, simplified stylus pen mounting structure using an elastic member.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. An apparatus comprising:
   a casing including a guide unit extending along a length of the casing for accommodating a stylus pen and an interior portion accommodating one or more electronic components of the apparatus, the guide unit having an inlet coupling the guide unit to an exterior of the casing and an outlet coupling an interior of the guide unit to the interior portion of the casing; and
   an elastic member closing the outlet and separating the interior of the guide unit from the interior portion of the casing,
   wherein the elastic member is inserted into the outlet and comprises:
   an elastic body; an engagement portion extended from one end portion of the elastic body and inserted inside the interior portion of the casing; at least one catching portion provided at the elastic body, for securing the elastic member inside the guiding unit; and a holder recessed into a surface of the elastic body opposite to the engagement portion, for keeping the stylus pen at an inserted position.

2. The apparatus of claim 1, wherein the inlet and the outlet keep the stylus pen secured by securing an upper portion and a lower end portion of the stylus pen, respectively.

3. The apparatus of claim 2, wherein the inlet comprises a guide member surrounding an outer circumferential surface of the upper portion of the stylus pen, for securing the stylus pen.

4. The apparatus of claim 3, further comprising a device disposed in the guide unit, for preventing the stylus pen from getting out of place.

5. The apparatus of claim 4, wherein the device comprises:
   a first catching protrusion protruding downward from an inner surface of the guide; and
   a second catching protrusion protruding in an outer circumferential direction from the outer circumferential surface of the upper portion of the stylus pen, for preventing the stylus pen from getting out of place by interworking with the first catching protrusion.

6. The apparatus of claim 1, further comprising the stylus pen, wherein the stylus pen includes a non-cylindrical head.

7. An apparatus comprising:
   a stylus pen;
   a casing including a guide unit extending along a length of the casing for accommodating the stylus pen and an interior portion accommodating one or more electronic components of the apparatus, the guide unit having an inlet coupling an interior of the guide unit to an exterior of the casing and an outlet coupling the guide unit to the interior portion of the casing; and
   an elastic member closing the outlet and separating the interior of the guide unit from the interior portion of the casing,
   wherein the elastic member is inserted into the outlet and comprises:
   an elastic body; an engagement portion extended from one end portion of the elastic body and inserted inside the interior portion of the casing; at least one catching portion provided at the elastic body, for securing the elastic member inside the guiding unit; and a holder recessed into a surface of the elastic body opposite to the engagement portion, for keeping the stylus pen at an inserted position.

8. The apparatus of claim 7, wherein the holder elastically keeping an end portion of the stylus secured.

* * * * *